June 16, 1964     E. A. MEYER     3,137,197

SHEET METAL NUT WITH SEALER ESCAPEMENT PORTS

Filed Aug. 26, 1960

INVENTOR.
Engelbert A. Meyer
BY
E. W. Christen
ATTORNEY

United States Patent Office 3,137,197
Patented June 16, 1964

3,137,197
SHEET METAL NUT WITH SEALER
ESCAPEMENT PORTS
Engelbert A. Meyer, Pontiac, Mich., assignor to General Motors Corporation, Detroit, Mich., a corporation of Delaware
Filed Aug. 26, 1960, Ser. No. 52,203
1 Claim. (Cl. 85—32)

This invention relates to fastening installations, and more particularly to a fastening installation utilizing a nut having a washer extending therefrom and a sealing material disposed between the washer and the parts to be joined.

In securing parts together it is often desirable to make use of nuts and threaded or unthreaded studs, such nuts being of the sheet metal or the usual solid type. In many installations, such as in automotive manufacture, it is desirable to secure two or more panels together, or to secure an object to a panel, in such a manner as to prevent the entry of dirt, water and other foreign materials through the necessary stud receiving apertures in the panels and to prevent the exposure of the panels to water or the like, leading to rust, corrosion and an unsightly appearance. In order to accomplish this result it is generally known to provide a sealing material between a combination nut and washer and the supporting panel in such a manner as to completely surround the aperture in the supporting panel by the sealing material.

One common form of installation is to utilize a nut and washer combination and a slab of sealing material disposed between the nut and the supporting panel. The commonly used nut is formed of sheet metal and is provided with an integral circular skirt or washer extending radially outwardly and downwardly from the bottom of the nut portion. Another type is a common solid nut with a skirt or washer secured thereto in some suitable manner. The amount of sealing material is sufficient to completely fill the nut and washer combination and to surround the aperture in the supporting panel. Numerous problems result from this type of installation. The main disadvantage is that the sealing material resists the force of the sheet metal nut and washer combination as it is advanced along the stud, causing either a false torque reading on the usual torque wrench, or causing the nut to strip the threads on the stud. If the nut is of the sheet metal type having a thread cutting or thread forming impression and the stud with which the nut assembly is used is an unthreaded stud, there is a tendency to form a concentric ring in the stud by the thread forming or thread cutting impression rather than to form a helical thread along the shank of the stud. Obviously, this would prevent any movement or advancement of the nut along the stud in the direction of the supporting panel.

The device in which this invention is embodied comprises a nut and washer combination suitable for use in securing panels or objects to panels with a sealing material disposed therebetween. Suitable means are provided to permit the escape of excess sealing material as the nut and washer combination is advanced along the stud, relieving the pressure of the sealing material and preventing the aforementioned resistance to the tightening of the nut. Only the excess amount of sealer is permitted to escape, thus assuring a sealed installation to prevent the formation of rust and corrosion about the aperture in the supporting panel.

This device comprises, generally, a nut having a skirt washer extending outwardly therefrom and with sealer escapement means formed in the skirt or washer to permit the escape of sealing material. The sealer escapement means may take the form of a turned down scalloped edge on the periphery of the skirt or washer. Further escapement may be provided by the addition of a plurality of holes formed through the skirt or washer between the turned down flange and the nut portion.

These and other objects and advantages may become more apparent from the following description and drawings, in which.

Figure 1:
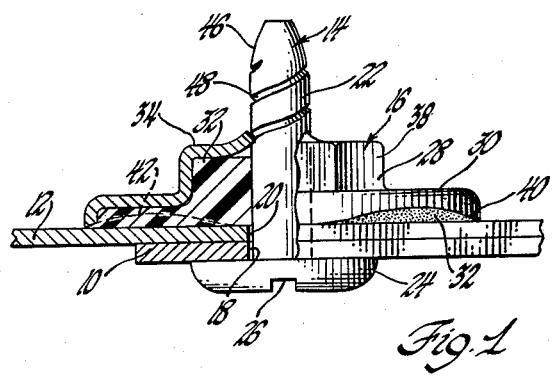
FIGURE 1 is an elevational view of a nut and stud installation with parts broken away and in section to illustrate the positions of the various parts.
Figure 2:
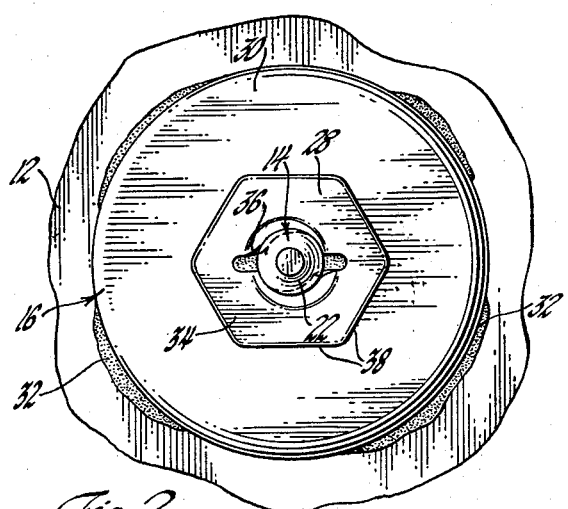
FIGURE 2 is a plan view of the installation illustrated in FIGURE 1 showing the position of the various parts.

Referring more particularly to the drawings, FIGURES 1 and 2 best illustrate the fastener installation. For ease in description, two supporting panels 10 and 12 are shown secured together by means of a stud, illustrated generally by the numeral 14, and a sheet metal nut and washer combination, illustrated generally by the numeral 16. Panels 10 and 12 are provided with suitable apertures 18 and 20, respectively, through which the shank 22 of stud 14 is received. Stud 14 is provided with an enlarged head 24, which may have a suitable groove or opening 26 to permit the use of a screwdriver, or like tool, in the assembly of the installation. Stud 14 may be threaded or unthreaded in its original condition depending on the type of nut and washer combination utilized in the installation. For ease in description, FIGURE 1 illustrates an unthreaded stud.

The nut and washer combination, illustrated generally by the numeral 16, is shown to be of the sheet metal type having an upper nut portion 28 and a skirt or washer 30 extending radially outwardly from the bottom of the nut portion 28. Disposed between the nut portion 28 and the supporting panel 12 is a suitable sealer material 32 which seals the apertures 18 and 20 in the supporting panels 10 and 12 and about the shank 22 of the stud 14.

Figure 3:
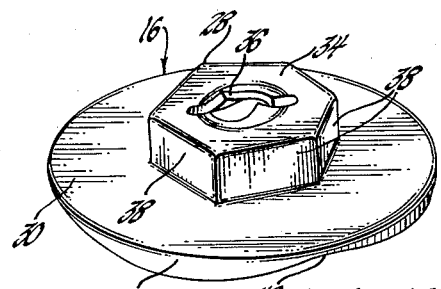
FIGURE 3 is an isometric view of the nut and washer combination illustrated in FIGURES 1 and 2.

Referring to FIGURE 3, one form of the nut and washer assembly 16 is illustrated. This shows a sheet metal nut having an upper surface 34 having a thread forming impression 36 formed therein. The impression 36 may be of any suitable type and may form the threads in the stud either by actually removing material and cutting a groove as the thread is formed, or by merely deforming the surface of the stud to provide a thread.

A plurality of side walls 38 extend downwardly from the upper surface 34 and in such a manner as to provide a polygonal shape to permit a standard wrench or the like to be utilized with the nut and washer combination.

Extending from the lower edges of the side walls 38 is the skirt or washer portion 30 which extends radially outwardly from the nut portion 18. The outer peripheral edge of the skirt or washer 30 is bent downwardly to form an annular flange 40, and the edge of the flange is scalloped to provide sealer escape ports 42. The longer portions of the flange are adapted to engage the surface of the supporting panel to provide a secure installation. It may be seen that openings 42 permit the escape of excess sealing material from under the nut and washer combination as the pressure of the sealing material is built up therebeneath.

Figure 4:
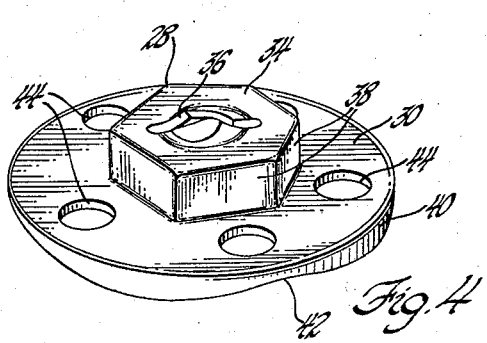
FIGURE 4 is an isometric view of a modification of the sheet metal nut and washer combination illustrated in FIGURES 1–3.

The modification shown in FIGURE 4 includes the scalloped flange 40 of the modification of FIGURE 3, and further includes a plurality of holes 44 through the skirt or washer 30 and between the flange 40 and side walls 38. This gives added sealer escapement means where such is necessary.

The installation of the nut and washer combination on the stud is relatively simple. The stud is first placed in the apertures 18 and 20 in the supporting panels and the nut and washer combination 16 with the sealing material 32 disposed therein is placed over the reduced portion 46 of the stud 14. The nut and washer combination 16 is then rotated by any suitable means to form a thread 48 in the shank 22 of the stud 14. This causes the nut and washer combination 16 to advance along the shank 22 in the direction of the supporting panels 10 and 12. As above stated, the pressure build-up of the sealing material 32 as the nut and washer combination is advanced, instead of resisting the advancement of the nut and washer combination, is relieved by the excess sealing material exuding from under the skirt or washer 30 at the openings 42 provided by the scalloped edge of the flange 40. When the nut and washer combination is fully positioned with respect to the supporting panels 10 and 12, the sealing material will have completely filled any voids in and around the apertures 18 and 20 in the supporting panels and close the openings 42 formed by the scalloped flange 40 in the washer portion 30. This will provide a fluid tight and dirt tight installation and a secure fastening of the two panels 10 and 12 together.

Thus, a fastening installation is provided which permits efficient sealing of the apertures in the supporting panels and still provides an efficient and positive securement of the parts together.

What is claimed is:

A nut and stud installation comprising: a support having an aperture formed therethrough; a stud extending through said aperture; a sheet metal nut received on said stud and comprising an upper wall having a stud receiving impression therein, a plurality of contiguous side walls extending from said upper wall and forming a polygonal hollow body, a continuous annular substantially planar washer extending radially outwardly from said side walls and an annular flange extending at substantially right angles from the outer periphery of said washer toward and engaging said support, said annular flange being scalloped at spaced locations along the edge thereof engaging said support; and a sealer material filling said hollow body portion of said nut member prior to installation and adapted to flow around said stud and said aperture upon installation, and excess sealing material being permitted to flow from said nut through said scallops in said annular flange upon tightening of said nut on said stud.

References Cited in the file of this patent

UNITED STATES PATENTS

| 2,284,081 | Beggs | May 26, 1942 |
| 2,775,917 | Ferguson | Jan. 1, 1957 |
| 3,086,421 | Hamman | Apr. 23, 1963 |

FOREIGN PATENTS

| 13,326 | Great Britain | Oct. 8, 1884 |

OTHER REFERENCES

Automotive Industries; vol. 115, page 141 October 15, 1956.